(12) United States Patent
Uhling et al.

(10) Patent No.: US 12,418,360 B2
(45) Date of Patent: *Sep. 16, 2025

(54) MANAGEMENT OF MESSAGE TRANSMISSION USING FORWARD ERROR CORRECTION

(71) Applicant: ITRON, INC., Liberty Lake, WA (US)

(72) Inventors: Thomas F. Uhling, Spokane Valley, WA (US); Keith Wayne Barnes, Waseca, MN (US); Danny Ray Seely, Spokane Valley, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,924

(22) Filed: Jul. 11, 2024

(65) Prior Publication Data
US 2024/0364450 A1    Oct. 31, 2024

Related U.S. Application Data

(63) Continuation of application No. 18/069,575, filed on Dec. 21, 2022, now Pat. No. 12,040,895.

(51) Int. Cl.
*H04L 1/00* (2006.01)

(52) U.S. Cl.
CPC .......... *H04L 1/0045* (2013.01); *H04L 1/0006* (2013.01); *H04L 1/0041* (2013.01); *H04L 1/0048* (2013.01); *H04L 1/0056* (2013.01); *H04L 1/0057* (2013.01); *H04L 1/0059* (2013.01); *H04L 1/0078* (2013.01)

(58) Field of Classification Search
CPC ... H04L 1/0045; H04L 1/0041; H04L 1/0048; H04L 1/0056; H04L 1/0057; H04L 1/0059; H04L 1/0078; H04L 1/0006

USPC .......... 714/776, 777, 752, 786, 784
See application file for complete search history.

(56) References Cited

U.S. PATENT DOCUMENTS

| | | | |
|---|---|---|---|
| 11,271,699 B1* | 3/2022 | Eyuboglu | H04L 1/1819 |
| 11,375,527 B1* | 6/2022 | Eyuboglu | H04B 7/15528 |
| 11,838,151 B1* | 12/2023 | Jones | H04L 25/0224 |
| 12,040,895 B1* | 7/2024 | Uhling | H04L 1/0059 |
| 2020/0389469 A1* | 12/2020 | Litichever | H04L 63/145 |
| 2022/0166542 A1* | 5/2022 | Ho | H03M 13/611 |

(Continued)

OTHER PUBLICATIONS

Ar-Reyouchi et al., "The Powerful Combined Effect of Forward Error Correction and Automatic Repeat Request to Improve the Reliability in the Wireless Communications", IEEE International Conference on Computational Science and Computational Intelligence, DOI 10.1109/CSCI.2015.39, 2015, pp. 691-696.

(Continued)

*Primary Examiner* — John J Tabone, Jr.
(74) *Attorney, Agent, or Firm* — Artegis Law Group, LLP (57) ABSTRACT

Techniques for managing message transmission using forward error correction include determining, by a communication application executing on a first node device based on one or more consecutive attempts to transmit messages to a second node device without using forward error correction (FEC) being unsuccessful, to use FEC to transmit messages to the second node device; and transmitting, by the communication application in response to determining to use FEC to transmit messages to the second node device, a first message to the second node device using FEC.

20 Claims, 6 Drawing Sheets

(56) References Cited

U.S. PATENT DOCUMENTS

2024/0214113 A1* 6/2024 Uhling .................. H04L 1/0045
2024/0364450 A1* 10/2024 Uhling .................. H04L 1/0048

OTHER PUBLICATIONS

Koutsonikolas et al., "The Case for FEC-based Reliable Multicast in Wireless Mesh Networks", 37th Annual IEEE/IFIP International Conference on Dependable Systems and Networks, 2007, 10 pages.
Weyulu et al., "A Dynamic Forward Error Control Scheme for Video Streaming Over Wireless Networks", IEEE International Conference on Computing, Networking and Communications, 2016, pp. 1-7.

* cited by examiner

MANAGEMENT OF MESSAGE TRANSMISSION USING FORWARD ERROR CORRECTION

CROSS-REFERENCE TO RELATED APPLICATIONS

This application is a continuation of United States patent application titled "Management of Message Transmission Using Forward Error Correction," filed on Dec. 21, 2022, and having Ser. No. 18/069,575. The subject matter of this related application is incorporated herein by reference.

BACKGROUND

Field of the Various Embodiments

The various embodiments relate generally to mesh networks, and more specifically, to the management of message transmission using forward error correction.

Description of the Related Art

In mesh networks, one or more node devices communicate using one or more communication media, such as various wired connections (e.g., Ethernet, power line communication (PLC), or the like) and/or wireless connections (e.g., WiFi®, Bluetooth®, radiofrequency (RF) communication, or the like). Many such mesh networks are self-organized as peer-to-peer networks, in which connections are established in response to the node devices discovering one another rather than based on a predefined topology or a centralized server. Data transmission between node devices in the mesh network that communicate wirelessly may be unreliable due to factors that degrade transmission. Techniques like forward error correction (FEC) can be used to improve transmission reliability.

BRIEF DESCRIPTION OF THE DRAWINGS

So that the manner in which the features of the various embodiments can be understood in detail, a description of the inventive concepts may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

In a mesh network, each node device of the mesh network can communicate with other node devices in the mesh network. In many cases that communication is wireless. Wireless communication allows for the transfer of information between devices without the use of a physical medium of transfer, such as wires or fiber optic cables. Wireless communications have ushered in countless new applications where the use of wires or other cabling is costly, impractical, or impossible.

While wireless communications provide many benefits, there are many factors that affect the reliability of wireless signal transmissions. These factors include obstructing physical objects (trees, masonry, physical structures) between node devices in the network, radio frequency interference from other devices transmitting wireless signals, electrical noise, environmental factors (weather, fog, lightning), and/or the like. In addition, some of these factors are not always present and can change in severity over time. Communications reliability can be improved using technologies such as FEC. FEC improves the reliability of wireless communication but requires more time to communicate the same information.

Forward error correction (FEC) is an error correction technique to detect and correct a limited number of errors in transmitted data without the need for retransmission. Generally, when using FEC, the sender transmits a redundant error-correcting code along with the message. The receiver performs checks based upon the additional redundant bits. If the receiver finds that the message is free from errors or a correctable number of errors, the receiver executes error-correcting code that generates the actual frame. It then removes the redundant bits before passing the message to the upper layers. Even when using FEC, if there are too many errors, the message is discarded without being acknowledged.

Error correcting codes for forward error correction can be broadly categorized into two types, namely, block codes and convolution codes. With block codes, the message is divided into fixed-sized blocks of bits to which redundant bits are added for error correction. With convolutional codes, the message includes data streams of arbitrary length and parity symbols are generated by the sliding application of a Boolean function to the data stream.

There four most used error correction codes are hamming codes, binary convolution codes, Reed-Solomon codes, and low-density parity-check (LDPC) codes. Hamming codes employ a block code that can detect up to two simultaneous bit errors and correct single-bit errors. Using binary convolution codes, the encoder processes an input sequence of bits of arbitrary length and generates a sequence of output bits. Reed-Solomon codes are block codes that are capable of correcting burst errors in the received data block. A low-density parity-check code is a block code specified by a parity-check matrix containing a low density of 1 s. They are suitable for large block sizes in very noisy channels. The type of FEC code to use is dependent on the application to which it is applied.

In some instances, an FEC transmission takes twice as long as a non-FEC transmission. Thus, using FEC reduces communication capacity and causes the communicating devices to consume more energy due to the longer transmission times. The use of FEC is not necessary when communications are reliable. Thus, using FEC only when needed helps to reduce transmission time and minimizes energy consumption, which can extend battery life in a battery-powered device.

One approach to determining or detecting when to use FEC includes first attempting to transmit a new message without using FEC, and after one or more failed attempts, then transmitting the message using FEC. A drawback with this approach is that time and energy are spent trying to transmit the message without FEC without taking into account whether previous messages required transmission using FEC. Thus, when interference is consistently high, the time and energy spent transmitting the message without using FEC before switching to transmitting the message using FEC is not productive.

Another approach to determining when to use FEC includes using a measure of signal strength (e.g., received signal strength indicator (RSSI)). A drawback to using measures of signal strength is that the signal strength does not always correlate with interference. High signal strength can mask the presence of interference. Thus, even when there is a high signal strength, a message that is transmitted without FEC can fail due to high interference. Similarly, signal strength can be low, but if there is limited interference, a message transmitted without using FEC is likely to be successfully received.

As discussed below, a solution that addresses the above issues includes using a technique that adapts to changing operating conditions but also does not waste resources monitoring those conditions too often. The proposed solution includes transmitting a message without using FEC and maintaining a history of how many times the message is retransmitted before an acknowledgment is received. If message reception is not successful after a threshold number of retries, then the message is transmitted using FEC. History is also maintained of the number of times FEC is used to transmit messages. When the history indicates that FEC is consistently being used to transmit messages, then FEC is used to transmit all future messages without first trying to transmit a message without using FEC. After a period of exclusive use of FEC to transmit messages, the process resets, and repeats, again trying to transmit messages without using FEC to confirm whether FEC is still needed to successfully transmit messages.

At least one technical advantage of the disclosed techniques is that, with the disclosed techniques, the amount of time spent transmitting messages is reduced by eliminating the transmission of messages without using FEC when interference conditions indicate that messages transmitted without using FEC are unlikely to be successfully received and acknowledged. This has the additional advantage of reducing network bandwidth and also reduces the energy consumption in the transmitting device, which extends battery life for battery powered devices. Another technical advantage of the disclosed techniques is that, with the disclosed techniques, the decision to use FEC is adaptable to current interference conditions.

Message Handling Based on Transmission History

Figure 1:
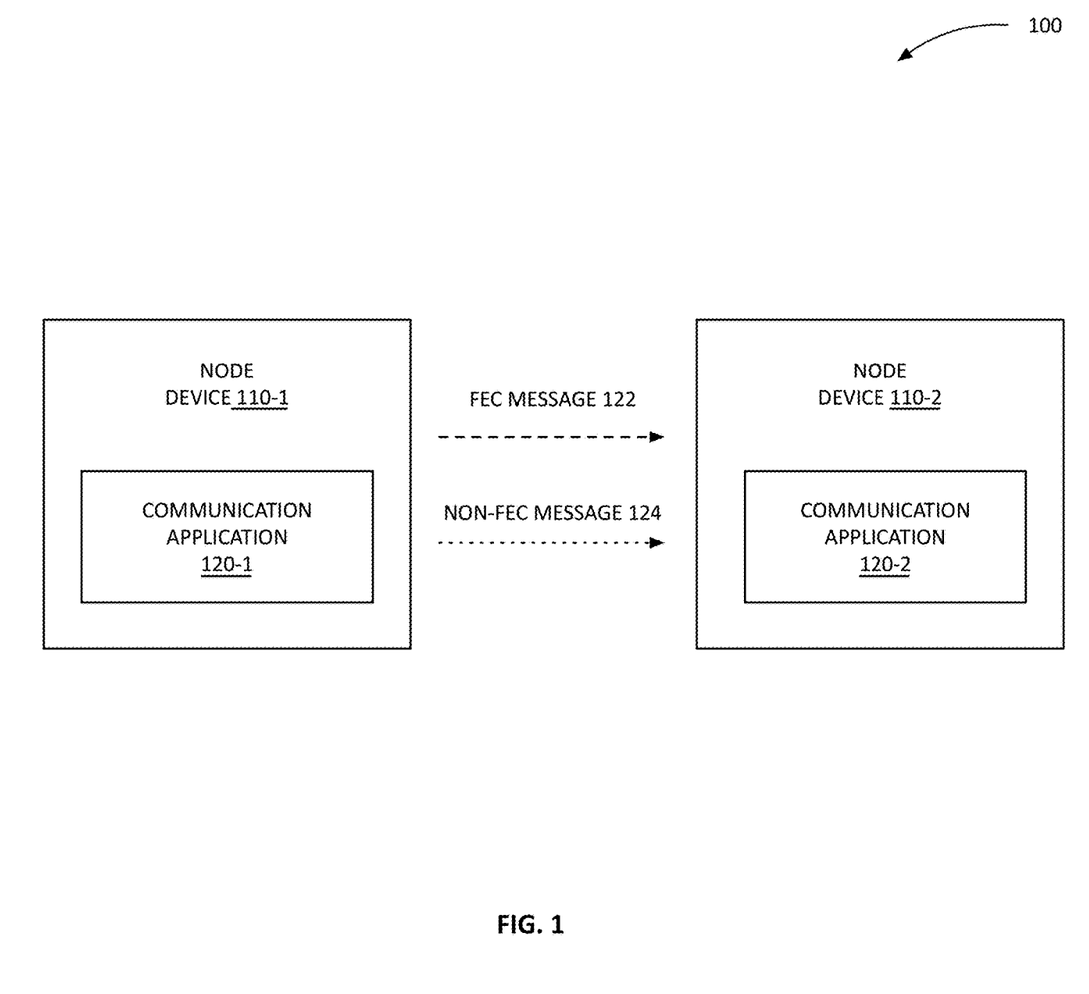
FIG. 1 illustrates a block diagram of a computer system according to one or more aspects of the various embodiments.

Referring now to FIG. 1, a block diagram of a computer system 100 is shown. In various embodiments, computer system 100 includes, without limitation, a node device 110-1 and a neighbor node device 110-2. Each node device 110 includes a communication application 120. In various embodiments node device 110-1 and node device 110-2 are node devices in a mesh network that are operable to communicate with each other and other node devices in the mesh network. In various embodiments, the node devices 110 communicate with each other over wireless communication. The node device 110-1 transmits messages to node device 110-2 using communications application 120-1 where the messages are received and processed by communications application 120-2. In some instances, the message being transmitted originates at node device 110-1. In some instances, the message being transmitted is received by node device 110-1 from another node device (not shown) and then retransmitted to node device 110-2. In various embodiments, when interference is high or the distance between node devices is nearing transmission limits, a FEC protocol is used to transmit a message as a FEC message 122 to improve the reliability of message reception. Additionally, or alternatively, a messages is transmitted as a non-FEC message 124 and does not use FEC. As discussed below, in some instances the message is only transmitted as a FEC message 122. In other instances, the message is only transmitted as a non-FEC message 124. In still other instances, a message is transmitted as a non-FEC message 124 before being transmitted as a FEC message 122. According to the techniques discussed below in further detail, the communications applications 120 maintains a history (e.g. record) of message transmissions when using FEC and not using FEC to determine when to transmit messages using FEC.

Figure 2:
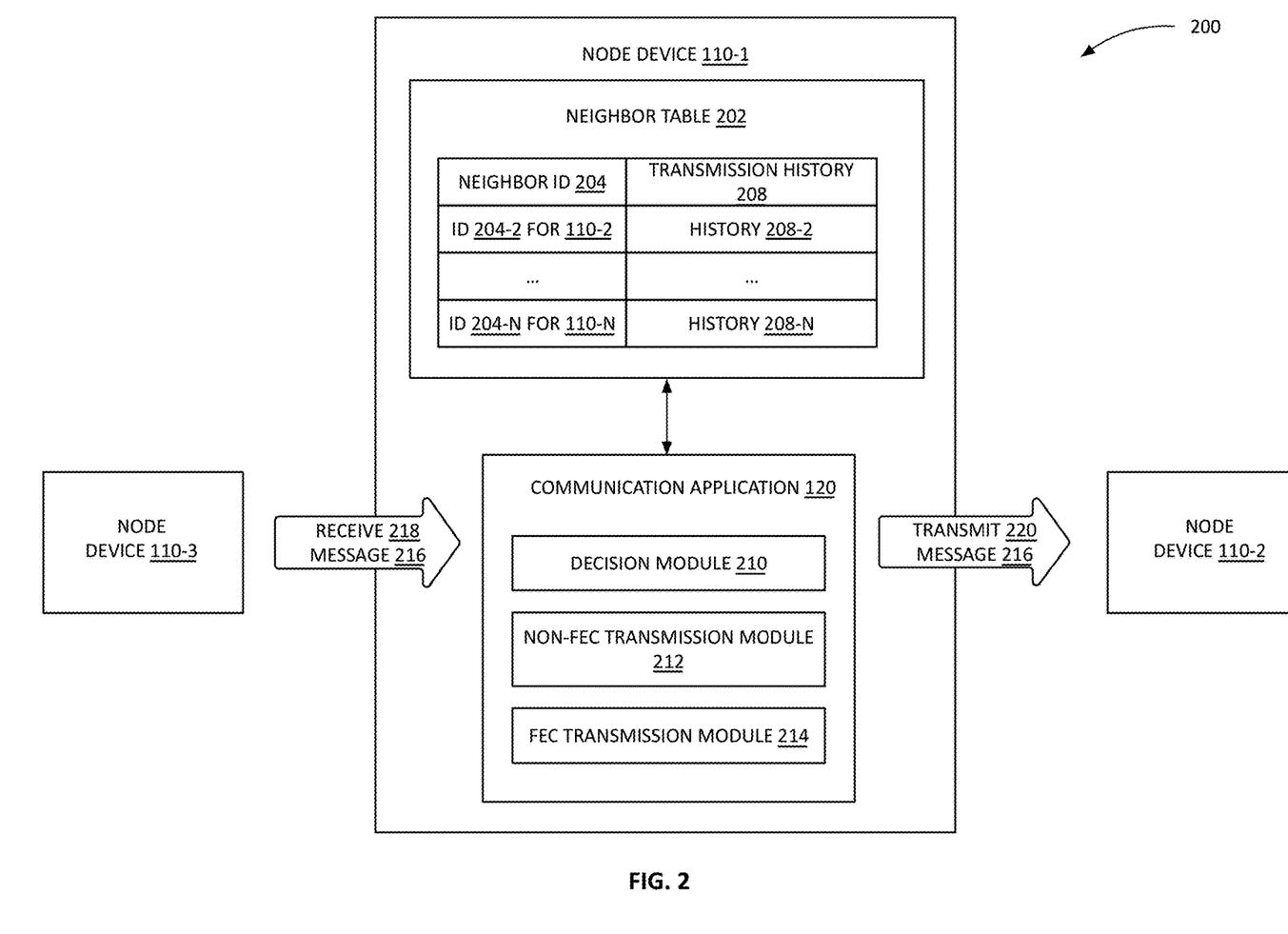
FIG. 2 illustrates a block diagram of message handling by a communication application of a node device, according to one or more aspects of the various embodiments.

FIG. 2 illustrates a block diagram 200 of message handling by a communication application 120 in node device 110-1, according to one or more aspects of the various embodiments. Although FIG. 2 describes the message handling for communication application 120-1, similar message handling is performed by other communication applications 120. Communication application 120-1 includes, without limitation, a decision module 210, a non-FEC transmission module 212, and a FEC transmission module 214. As shown in FIG. 2, communication application 120-1 receives 218 a message 216 to be transmitted 220. As shown in FIG. 2, message 216 is received 218 externally from a third node device 110-3. Alternatively, message 216 can be received internally from an application (not shown) executing on node device 110-1. Based on a destination address associated with or included in message 216, communication application 120-1 determines a neighbor node device to transmit 220 message 216 to, such as node device 110-2 as shown in FIG. 2. In some embodiments, communication application 120-1 looks up the destination address in a next hop table to determine that message 216 is to be transmitted 220 to node device 110-2 so that message 216 can reach the node device associated with the destination address.

Once communication application 120-1 determines that message 216 is to be transmitted 220 to node device 110-2, communications application 120-1 accesses a neighbor table 202 to retrieve an entry 204-2 associated with node device 110-2 to access information about the neighbor node device. Neighbor table 202 includes entries for each of the neighbor node devices to node device 110-1. Each entry associates a node ID 204 of a neighbor node device and a transmission history 208 for the node device having that ID. In some examples, the node ID 204 for a node device is an address for the node device, such as a MAC address. As shown, neighbor table 202 includes entries for node devices 110-2 and 110-n, although it is understood that neighbor table 202 could include any number of entries based on the number of neighbors that node device 110-1 has.

Transmission history 208 includes information about the transmission of previous messages from node device 110-1 to the corresponding node device. For example, transmission history 208-2 includes information about the transmission of previous messages from node device 110-1 to node device 110-2. In some embodiments, transmission history 208 includes various counters that keep track of the number of successful and unsuccessful messages transmitted by node device 110-1 to the corresponding neighbor node device 110-2, the number of successive FEC or non-FEC messages transmitted, and/or the like. In some embodiments, the counters include, without limitation, variables V1-V5 as shown in Table 1 below. Additionally, and/or alternatively, in some embodiments, other types of transmission history 208 information is stored.

TABLE 1

| ID | ELEMENT | DESCRIPTION |
|---|---|---|
| V1 | nhtSuccessiveFEC | The number of successive unicast transmissions that were successful (an ACK was received) using FEC. |
| V2 | nhtSuccessiveNoFEC | The number of successive unicast transmissions that were successful (an ACK was received) without using FEC. |
| V3 | varNoAckRx | Variable to count the number of consecutive unicast failures due to no ACK reception. |
| V4 | nhtNumbMessFailures | Number of unicast message attempts that resulted in a failure to successfully be transmitted to the destination address (no ACK received). |
| V5 | nhtFECEnabled | An indication that the receiving node device is enabled for FEC transmission. |

Figure 3:
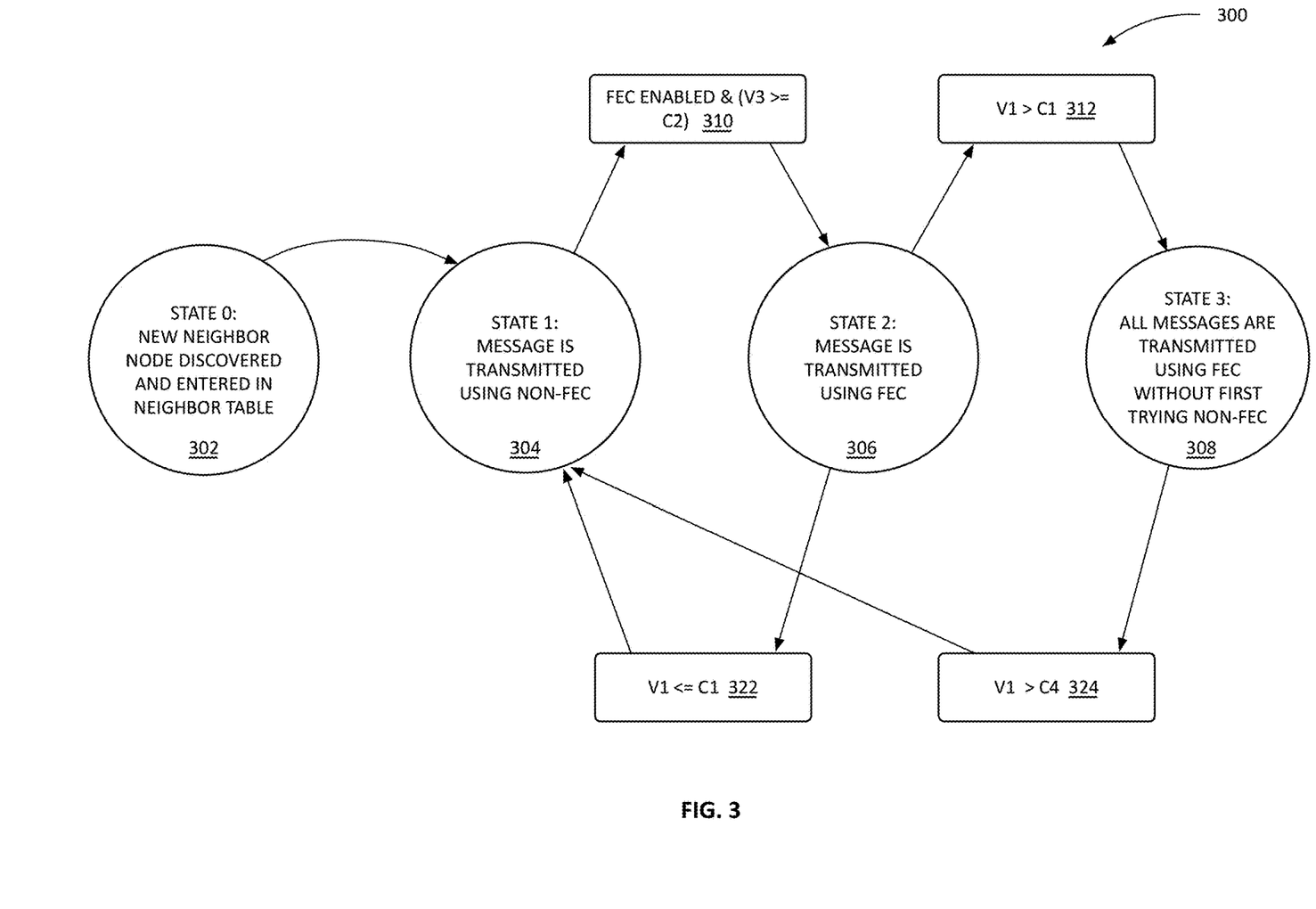
FIG. 3 illustrates a state diagram used by a communication application to determine when to transmit messages using FEC or without FEC, according to one or more aspects of the various embodiments.

The transmission history 208 retrieved from neighbor table 202 is provided to decision module 210. Decision module 210 uses the transmission history to determine whether message 216 should be transmitted 220 to node device 110-2 using FEC or without FEC. Examples of techniques used by decision module 210 to decide whether to transmit 220 message 216 to node device 110-2 using FEC or without using FEC are described in further detail below with reference to FIGS. 3 and 4. When the decision is to transmit 220 message 216 without using FEC, message 216 is transmitted 220 to node device 110-2 using non-FEC transmission module 212, which transmits 220 message 216 without using FEC. When the decision is to transmit 220 message 216 using FEC, message 216 is transmitted 220 to node device 110-2 using FEC transmission module 214, which transmits 220 message 216 using FEC. FIG. 3 is a state machine 300 used to determine whether a message is to be transmitted using FEC or without using FEC, according to one or more aspects of the various embodiments. Although state machine 300 is described below as being maintained by communication application 120-1 of FIGS. 1 and 2, any other technically feasible arrangement of applications and modules capable of maintaining state machine 300 can be used.

State Machine

FIG. 3 illustrates a state diagram used by a communication application to determine when to transmit messages using FEC or without FEC, according to one or more aspects of the various embodiments. As shown in FIG. 3, a state machine 300 includes, without limitation, state zero (initial state) 302, state one (use non-FEC state) 304, state two (use FEC state) 306, and state three (always use FEC state) 308. Communication application 120-1 maintains a separate state machine 300 for each node device in neighbor table 202. In some embodiments, the current state of state machine 300 is stored in neighbor table 202 as part of transmission history 208. Whenever communication application 120-1 prepares to transmit a message (e, message 216), either as a first attempt or a retry attempt, the communication application 120-1 uses the current state of state machine 300 to determine whether the message should be transmitted with FEC or without FEC. Following message transmission, various counters in the transmission history are updated depending on the state of the state machine. Additional updates to various counters in the transmission history are also made based on whether an acknowledgment (ACK) is received for a message or a timeout occurs while waiting for an acknowledgment. Communication application 120-1 also updates transmission history 208 based on each attempt to transmit the message as is described further below.

State machine 300 begins in initial state 302. Initial state 302 is entered whenever a new neighbor node device is discovered, and a communication link is established with that neighbor node device. When initial state 302 is entered, an entry for the neighbor node device is created in neighbor table 202 and an identifier (e.g., a network address such as a MAC address) for the neighbor node device is recorded as node ID 204. As part of the discovery procedure with the neighbor node device, the neighbor node device provides an indication of whether the neighbor node device supports FEC and has FEC enabled. This indication is recorded as receiving node device FEC enabled (V5). The rest of transmission history 208 is then initialized. In some embodiments where transmission history 208 includes the counters of Table 1, the variables V1-V4 are each initialized to zero. Once transmission history 208 is initialized, state machine 300 transitions to use non-FEC state 304.

When state machine 300 is in use non-FEC state 304, the message is transmitted without using FEC using non-FEC transmission module 212. Non-FEC transmission module 212 starts a timer to wait before determining that the message was not successfully received (i.e. timer timing out), and the message should be re-transmitted or dropped.

If an acknowledgment (ACK) is received for the message, the timer is canceled and the transmission history 208 is updated. In some embodiments, the number of transmissions with no ack counter (V3) is reset to zero and the number of successive non-FEC transmissions (V2) is incremented by one. Further, when the number of successive non-FEC transmissions (V2) is greater than or equal to the non-FEC transmissions threshold (C5), the number of successive FEC transmissions (V1) is reset to zero and state machine 300 remains in use non-FEC state 304. The non-FEC transmissions threshold (C5) is the threshold of successful transmission attempts without FEC used to determine when the (V1) number of successive FEC transmissions count is set back to zero. This check covers the scenario where FEC transmission has been required for several message deliveries but is followed by a string of successive successful message deliveries using non-FEC transmission. By setting the number of successive FEC transmissions counter (V1) back to zero the decision to transition to always use FEC state 308 is delayed. In some embodiments, the non-FEC transmissions threshold (C5) is set to a value between two and five, inclusive, such as three.

If the timer times out before an acknowledgment (ACK) is received, then the (V3) number of transmissions with no ack counter is incremented by one. A determination is then made whether to make another attempt to transmit the message without using FEC or transition to transmitting the message using FEC. In some embodiments, the determination to switch to transmitting using FEC is based on whether FEC is enabled for both the transmitting node device (e.g., node device 110-1) and the receiving node device (e.g., node device 110-2 as indicated by V5 in transmission history 208) and how many unsuccessful attempts have been made to transmit the message without using FEC as indicated by the number of transmissions with no ack (V3). If the number of transmissions with no ack (V3) is greater than or equal to the number FEC attempts threshold (C2) then the communication application 120 transitions 310 from use non-FEC state 304 to use FEC state 306 for the next message transmission. The transmission attempts threshold (C2) is the number of attempts to receive an acknowledgment for attempts without using FEC before attempting to transmit the message using FEC. In some embodiments, the transmission attempts threshold (C2) is set to a value between two and five, inclusive, such as three. When FEC is not supported for this message transmission, a further determination is made as to whether the message should be dropped without further attempts to transmit the message based on how many unsuccessful attempts have been made to transmit the message. If the number of transmissions with no ack (V3) is greater than or equal to the max transmission attempts (C3), the number of message failures (V4) is incremented by one, the message is dropped, the number of transmissions with no ack (V3) is reset to zero, and state machine 300 remains in use non-FEC state 304. Otherwise, when the number of transmissions with no ack (V3) is less than the max transmission attempts (C3), the transmission is retried using non-FEC again. The transmission attempts threshold (C3) is the maximum number of attempts to receive an acknowledgment (ACK) during transmission and is set to a value between three and seven, inclusive, such as five. In practice, the condition where the number of transmissions with no ack (V3) is greater than or equal to the max transmission attempts (C3) should only ever be true in the situation where FEC is not enabled for at least one of the node devices, the transmitting node device FEC Enabled or receiving node device FEC enabled (V5). In cases where FEC is enabled for both node devices, state machine 300 transitions from use non-FEC state 304 to use FEC state 306 before this condition is met.

When state machine 300 is in use FEC state 306, the message is transmitted using FEC using FEC transmission module 214. FEC transmission module 214 starts a timer to determine how long to wait before determining that the message was not successfully received and that the message should be re-transmitted or dropped.

If an acknowledgment (ACK) is received for the message, the timer is canceled and the transmission history 208 is updated. In some embodiments the number of transmissions with no ack counter (V3) is reset to zero, the number of successive FEC transmissions (V1) is incremented by one, and the number of successive non-FEC transmissions (V2) is reset to zero. Communication application 120 then determines whether to transition to always using FEC or to revert to non-FEC transmission for the next message transmission. In some embodiments, the transition determination is based on the number of successive FEC transmissions (V1). When the number of successive FEC transmissions (V1) is greater than the FEC trigger threshold (C1), the communication application 120 transitions 312 from use FEC state 306 to always use FEC state 308 for the next message transmission. Otherwise, when the number of successive FEC transmissions (V1) is less than or equal to the FEC trigger threshold (C1), the communication application 120 transitions 322 from use FEC state 306 to use non-FEC state 304 for the next message. The FEC trigger threshold (C1) is used to determine when FEC shall be used for all unicast transmission attempts without first trying transmission without FEC to a receiving node device and is set to a value between four and eight, inclusive, such as six in some embodiments.

If the time times out before an acknowledgment (ACK) is received, then the number of transmissions with no ack counter (V3) is incremented by one. When the number of transmissions with no ack (V3) is greater than or equal to max transmission attempts (C3) then the number of successive FEC transmissions (V1) is incremented by one, the number of message failures (V4) is incremented by one, and the message is dropped. If the number of transmissions with no ack counter (V3) is less than max transmission attempts (C3) then the transmission is retried using FEC again otherwise the message is dropped.

When state machine 300 is in always use FEC state 308, the message is transmitted using FEC using FEC transmission module 214. FEC transmission module 214 starts a timer to wait before determining that the message was not successfully received and whether the message should be re-transmitted or dropped.

If an acknowledgment (ACK) is received for the message, the timer is canceled and the transmission history 208 is updated. In some embodiments the number of transmissions with no ack counter (V3) is reset to zero, the number successive FEC transmissions (V1) is incremented by one and the number successive non-FEC transmissions (V2) is reset to zero. Communication application 120 then determines whether to remain in always use FEC state 308 or to reset the state machine. In some embodiments, the determination is based on the number successive FEC transmissions (V1). When the number successive FEC transmissions (V1) is greater than successive FEC transmissions before reset threshold (C4) then the communication application 120 transitions 324 from always use FEC state 308 to use non-FEC state 304 and number successive FEC transmissions (V1) is reset to zero. The successive FEC transmissions before reset threshold (C4) is the number of successive FEC transmissions before the state machine resets and starts over. This check ensures that the state does not remain in always use FEC state 308 indefinitely. Transmission interference can change over time, and periodically resetting state machine 300 to use non-FEC state 304 ensures that state machine 300 accounts for those changes in interference. In some embodiments, the successive FEC transmissions before reset threshold (C4) is set to a value between one hundred and fifty and two hundred and fifty, inclusive, such as two hundred.

If no acknowledgment (ACK) is received, then the number of transmissions with no ack counter (V3) is incremented by one. When the number of transmissions with no ack (V3) is greater than or equal to max transmission attempts (C3) then the number of successive FEC transmissions (V1) is incremented by one, the number of message failures (V4) is incremented by one, and the message is dropped. Otherwise, the number of transmissions when the no ack counter (V3) is less than max transmission attempts (C3) and the transmission is retried using FEC.

Message Transmission Process

Figure 4:
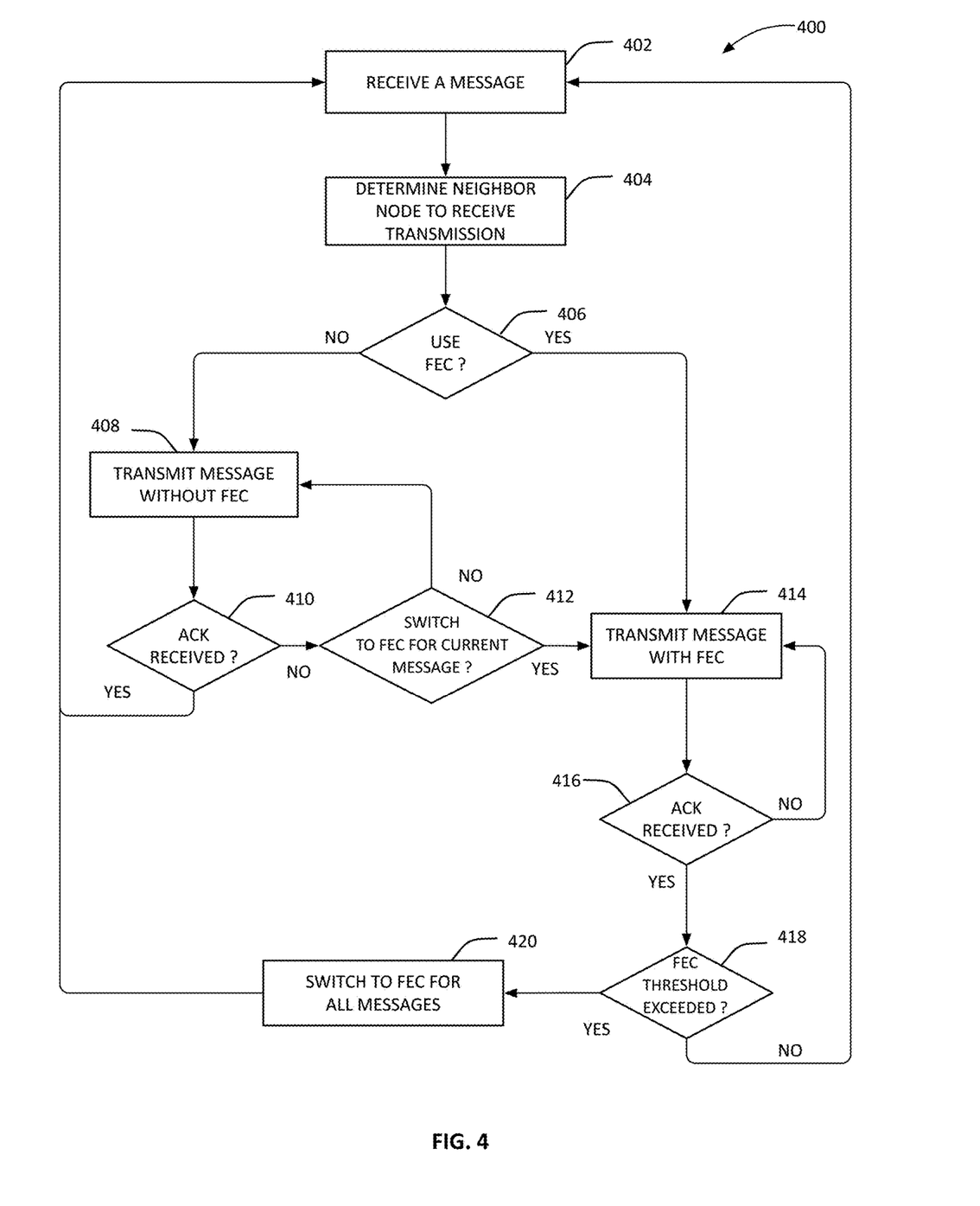
FIG. 4 is a flow diagram of method steps for transmitting a message, according to one or more aspects of the various embodiments.

FIG. 4 is a flow diagram of method steps for transmitting a message, according to various embodiments. The method steps of FIG. 4 can be performed, for example, by any of the communication applications 120 of FIGS. 1 and 2, such as communication application 120-1, and in accordance with state machine 300 of FIG. 3. Although the method steps are described in conjunction with the embodiments of FIGS.

1-3, persons of ordinary skill in the art will understand that any system of communication application configured to perform the method steps, in any order, is within the scope of the present disclosure.

As shown, a method 400 begins at step 402, when communication application 120-1 receives a message for transmission. The message can be received from a third node device 110-3, or it can originate at the current node device 110-1.

At step 404, communication application 120-1 determines based on a destination address associated with or included in message 216 a neighbor node device such as node device 110-2 to transmit the message to. In some embodiments, communication application 120-1 looks the destination address up in a next hop table to determine that message 216 is to be transmitted to node device 110-2 so that message 216 can reach the node device associated with the destination address.

At step 406, decision module 210 determines whether to use FEC to transmit the message based on the transmission history 208 from the neighbor table 202. In some embodiments, decision module 210 determines whether to use FEC to transmit the message based on the current state of state machine 300. When state machine 300 is in use non-FEC state 304, the message is transmitted using non-FEC by step 408. When state machine 300 is in use FEC state 306 or always use FEC state 308, the message is transmitted using FEC by step 414.

At step 408, the non-FEC transmission module 212 transmits the message without using FEC. Non-FEC transmission module 212 starts a timer to wait before determining whether the message was successfully received or whether the message should be re-transmitted or dropped.

At step 410, communication application 120-1 determines whether an ACK is received for the message transmitted during step 408. If an acknowledgment (ACK) is received (410 YES), the timer is canceled, the number of transmissions with no ack counter (V3) is reset to zero and the number of successive non-FEC transmissions (V2) is incremented by one. And the method continues at step 402 to wait for a next message. Additionally, if the number of successive non-FEC transmissions (V2) is greater than or equal to the non-FEC transmissions threshold (C5), then the number of successive FEC transmissions (V1) is reset to zero. If the timer started during step 408 times out without an acknowledgment (ACK) being received (410 NO), then the number of transmissions with no ack counter (V3) is incremented by one and method 400 continues at step 412.

At step 412, decision module 210 performs a check to determine whether to switch to FEC transmission for the current message. If FEC is enabled for the transmitting node device (e.g., node device 110-1), FEC enabled (V5) is true for the receiving node device (e.g., node device 110-2) and the number of transmissions with no ack (V3) is greater than the transmission attempts threshold (C2) (412 YES), then communication application 120-1 transitions state machine 300 from use non-FEC state 304 to use FEC state 306 and transmitting the message using FEC by step 414. Otherwise (412 NO), the message is transmitted again without using FEC by returning to step 408. In the case where FEC enabled (V5) is false (not shown), the message is transmitted again without using FEC until the message receives an acknowledgment (ACK) or the number of transmissions with no ack (V3) exceeds the transmission attempts threshold (C2) at which point the message is dropped.

At step 414, the FEC transmission module 214 transmits the message using FEC. FEC transmission module 214 starts a timer to wait before determining whether the message was successfully received or whether the message should be re-transmitted or dropped.

At step 416, communication application 120-1 determines whether an ACK is received for the message transmitted during step 414 If an acknowledgment (ACK) is received (416 YES), the timer is canceled, the number of transmissions with no ack counter (V3) is reset to zero, the number of successive FEC transmissions (V1) is incremented by one, and the number of successive non-FEC transmissions (V2) is reset to zero and the method continues at step 418. If the timer started during step 414 times out without an acknowledgment (ACK) being received (416 NO), then the number of transmissions with no ack counter (V3) is incremented by one. If the number of transmissions with no ack (V3) is greater than or equal to max transmission attempts (C3) then the number of successive FEC transmissions (V1) is incremented by one, the number of message failures (V4) is incremented by one, and the message is dropped (not shown). Otherwise, the number of transmissions with no ack (V3) is less than max transmission attempts (C3) and the transmission is retried using FEC by step 414.

At step 418, communication application 120-1 performs a check to determine whether to switch to FEC transmission for future messages without first trying to transmit the messages without using FEC. Decision module 210 determines whether to switch to FEC transmission for future messages when the number of successive FEC transmissions (V1) is greater than the FEC trigger threshold (C1). If the check is true and the number of successive FEC transmissions (V1) is greater than the FEC trigger threshold (C1) (418 YES) then the method continues at step 420, otherwise method 400 continues (418 NO) at step 402 to wait for the next message.

At step 420, communication application 120-1 switches to using FEC for future messages without first trying to transmit the message without using FEC. Communication application 120-1 transitions state machine 300 from use FEC state 306 to always use FEC state 308. Method 400 then continues by returning to step 402 to wait for another message.

Although not shown in FIG. 4, in some embodiments, whenever communication application 120-1 receives an ACK for a message transmitted using FEC while state machine 300 is in always use FEC state 308, communication application 120-1 determines whether to always using FEC for the next message without first trying transmission without using FEC or whether to reset state machine 300. When the number of successive FEC transmissions (V1) is greater than the successive FEC transmissions threshold (C4), then the number of successive FEC transmissions (V1) is reset to zero and non-FEC transmission is once again tried for messages by transitioning state machine 300 from always use FEC state 308 back to use non-FEC state 304.

Figure 5:
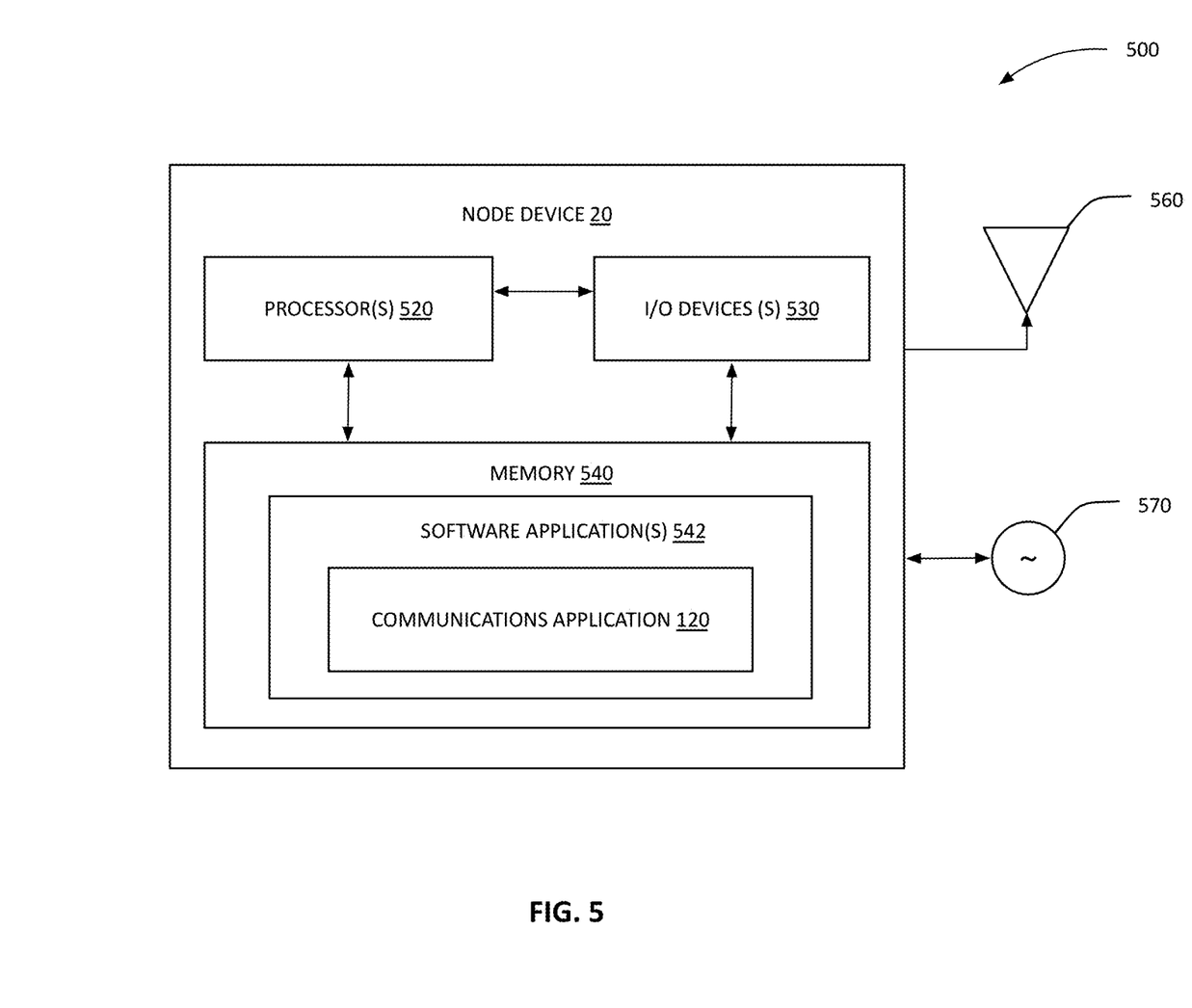
FIG. 5 illustrates an exemplary node device that can be included in a mesh network and which is configured to implement one or more aspects of the various embodiments.

FIG. 5 illustrates an exemplary node device (or node or network device) 500 that can be included in a mesh network and used to implement one or more aspects of the various embodiments discussed above with respect to FIGS. 1-4. Node device 500 includes, without limitation, one or more processors 520, one or more input/output (I/O) devices 530, one or more memories 540, one or more transceivers 560, and an oscillator 570. In some embodiments, node device 500 is consistent with any of node devices 110.

Node device 500 is a network device and includes computing device hardware configured to perform various processing operations and execute program code. The node device 500 can further include various analog-to-digital and digital-to-analog converters, digital signal processors (DSPs), harmonic oscillators, transceivers, and any other components generally associated with RF-based communication hardware. In various embodiments, node device 500 includes a battery (not shown) that supplies power to the various computing device hardware included in node device 500.

The one or more processors 520 can include any hardware configured to process data and execute software applications 542. At least one of the one or more processors 520 can include a real-time clock (RTC) (not shown) according to which processor 520 maintains an estimate of the current time. At least one of the one or more processors 520 executes communication application 120.

The one or more I/O devices 530 include devices configured to receive input, devices configured to provide output, and devices configured to both receive input and provide output. In various embodiments, the one or more I/O devices include typical I/O devices, such as a keyboard, a mouse, a joystick, a touchpad, a touchscreen, a microphone, an inertial measurement unit (IMU), a display, a speaker, a haptic generator, or the like. In various embodiments, the one or more I/O devices include various sensors for measuring and collecting metrology data, such as data associated with the delivery and consumption of gas, water, electricity, or the like. In various embodiments, the one or more I/O devices include controllers, actuators, or the like.

The one or more transceivers 560 can include one more interfaces that are associated with various communication media. In various embodiments, the one or more transceivers include at least one of a wireless radio frequency (RF) communication interface, an Ethernet interface, a power line communication interface, or the like.

The memory 540 can be implemented by any technically feasible storage medium, including volatile and/or non-volatile storage media. Memory 540 includes, without limitation, a communication application 120. Communication application 120 includes program code that, when executed by the one or more processors 520, performs any of the communications (e, messages, acknowledgements, presence advertisement) functionality (e, transmission, reception) described herein. In various embodiments, the communications functionality includes reception and transmission of messages, acknowledgement, advertising presence of a node device and/or the like, such as the operations described above in conjunction with FIGS. 1-4.

System Overview

Figure 6:
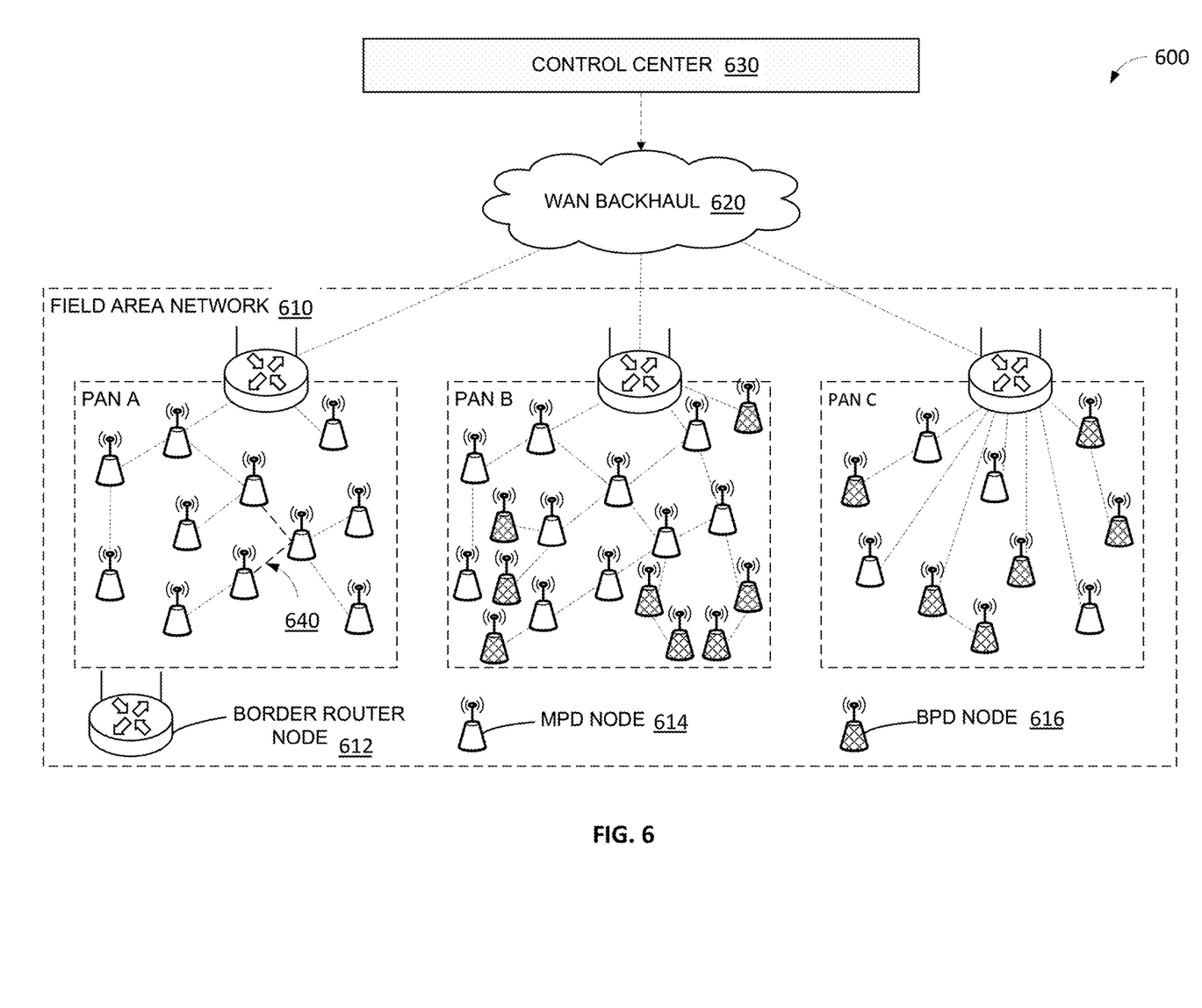
FIG. 6 illustrates a network system configured to implement one or more aspects of the various embodiments.

FIG. 6 illustrates a network system configured to implement one or more aspects of the present embodiments. As shown, network system 600 includes a field area network (FAN) 610, a wide area network (WAN) backhaul 620, and a control center 630. FAN 610 is coupled to control center 630 via WAN backhaul 620. Control center 630 is configured to coordinate the operation of FAN 610.

FAN 610 includes personal area network (PANs) A, B, and C. PANs A and B are organized according to a mesh network topology, while PAN C is organized according to a star network topology. Each of PANs A, B, and C includes at least one border router node device 612 and one or more mains-powered device (MPD) node devices 614. PANs B and C further include one or more battery-powered device (BPD) node devices 616. Any of border router node device 612, the one or more MPD node devices 614, or the BPD node devices 616 can be used to implement the techniques discussed above with respect to FIGS. 1-4. In various embodiments, node devices 110 are implemented as node device 612, 614, or 616. Further, node device 500 shown in FIG. 5 can be implemented in FAN 610 as any of node devices 612, 614, and/or 616.

MPD node devices 614 draw power from an external power source, such as mains electricity or a power grid. MPD node devices 614 typically operate on a continuous basis without powering down for extended periods of time. BPD node devices 616 draw power from an internal power source, such as a battery. BPD node devices 616 typically operate intermittently and power down, go to very low power mode, for extended periods of time in order to conserve battery power.

MPD node devices 614 and BPD node devices 616 are coupled to, or included within, a utility distribution infrastructure (not shown) that distributes a resource to consumers. MPD node devices 614 and BPD node devices 616 gather sensor data related to the distribution of the resource, process the sensor data, and communicate processing results and other information to control center 630. Border router node devices 612 operate as access points to provide MPD node devices 614 and BPD node devices 616 with access to control center 630.

Any of border router node devices 612, MPD node devices 614, and BPD node devices 616 are configured to communicate directly with one or more adjacent node devices via bi-directional communication links 640. The communication links 640 can be wired or wireless links, although in practice, adjacent node devices of a given PAN exchange data with one another by transmitting data packets via wireless radio frequency (RF) communications. The various node device types are configured to perform a technique known in the art as "channel hopping" in order to periodically receive data packets on varying channels. As known in the art, a "channel" can correspond to a particular range of frequencies. In one embodiment, a node device can compute a current receive channel by evaluating a Jenkins hash function based on a total number of channels and the media access control (MAC) address of the node device.

Each node device within a given PAN can implement a discovery protocol to identify one or more adjacent node devices or "neighbors." A node device that has identified an adjacent, neighboring node device can establish a bi-directional communication link 640 with the neighboring node device. Each neighboring node device can update a respective neighbor table to include information concerning the other node device, including the MAC address of the other node device as well as a received signal strength indication (RSSI) of the communication link 640 established with that node device.

Node devices can compute the channel hopping sequences of adjacent node devices to facilitate the successful transmission of data packets to those node devices. In embodiments where node devices implement the Jenkins hash function, a node device computes a current receive channel of an adjacent node device using the total number of channels, the MAC address of the adjacent node device, and a time slot number assigned to a current time slot of the adjacent node device.

Any of the node devices discussed above can operate as a source node device, an intermediate node device, or a destination node device for the transmission of data packets. A given source node device can generate a data packet and then transmit the data packet to a destination node device via any number of intermediate node devices (in mesh network topologies). The data packet can indicate a destination for the packet and/or a particular sequence of intermediate node devices to traverse in order to reach the destination node device. In one embodiment, each intermediate node device can include a forwarding database indicating various network routes and cost metrics associated with each route.

Node devices can transmit data packets across a given PAN and across WAN backhaul 620 to control center 630. Similarly, control center 630 can transmit data packets across WAN backhaul 620 and across any given PAN to a particular node device included therein. As a general matter, numerous routes can exist which traverse any of PANs A, B, and C and include any number of intermediate node devices, thereby allowing any given node device or other component within network system 600 to communicate with any other node device or component included therein.

Control center 630 includes one or more server machines (not shown) configured to operate as sources for, or destinations of, data packets that traverse within network system 600. The server machines can query node devices within network system 600 to obtain various data, including raw or processed sensor data, power consumption data, node device/network throughput data, status information, and so forth. The server machines can also transmit commands and/or program instructions to any node device within network system 600 to cause those node devices to perform various operations.

1. According to some embodiments, a method comprises receiving, by a communication application executing on a first node device of a mesh network, a message; determining, by the communication application, a second node device in the mesh network to transmit the message to, the second node device being a neighbor of the first node device; determining, by the communication application based on a history of forward error correction (FEC) and non-FEC transmissions with the second node device, that FEC should be used to transmit the message; and transmitting, by the communication application in response to determining that FEC should be used to transmit the message, the message to the second node device using FEC.
2. The method according to clause 1, wherein determining the second node device comprises determining the second node device based on a destination address associated with the message.
3. The method according to clause 1 or clause 2, wherein determining that FEC should be used to transmit the message comprises determining that the first node device of the mesh network and the second node device of the mesh network both support FEC and determining that a minimum number of transmissions of the message without using FEC were unsuccessful.
4. The method according any of clauses 1-3, wherein determining that FEC should be used to transmit the message comprises determining that messages transmitted between the first node device and the second node device should be transmitted using FEC without first attempting to transmit the messages without using FEC.
5. The method according to any of clauses 1-4, further comprising updating, by the communication application, the history of FEC and non-FEC transmissions with the second node device, in response to transmitting the message to the second node device using FEC.
6. The method according to any of clauses 1-5, further comprising updating, by the communication application, the history of FEC and non-FEC transmissions with the second node device in response to receiving an acknowledgment from the second node device for the message or a timer timing out without receiving the acknowledgment.
7. The method according to any of clauses 1-6, wherein the history of FEC and non-FEC transmissions with the second node device comprises one or more counters selected from a group consisting of: a counter storing a count of message transmissions using FEC where an acknowledgment was received, a counter storing a count of message transmissions without using FEC where an acknowledgment was received, and a counter storing a count of message transmissions without receiving an acknowledgment.
8. The method according to any of clauses 1-7, further comprising receiving, by the communication application, a second message; determining, by the communication application, a third node device in the mesh network to transmit the second message to, the third node device being a neighbor of the first node device; determining, by the communication application based on the history of forward FEC and non-FEC transmissions with the third node device, that the message should be transmitted without using FEC; and transmitting, by the communication application in response to determining that the message should be transmitted without using FEC, the second message to the third node device without using FEC.
9. According to some embodiments, one or more non-transitory computer-readable media storing instructions that, when executed by one or more processors, cause the one or more processors of a first node in a mesh network to perform the steps of receiving, by a communication application executing on the first node of the mesh network, a message; determining, by the communication application, a second node in the mesh network to transmit the message to, the second node being a neighbor of the first node stored in a neighbor table; determining, by the communication application based on a record of previous forward error correction (FEC) and non-FEC transmissions with the second node, that FEC should be used to transmit the message; and transmitting, by the communication application, in response to determining that FEC should be used to transmit the message, the message to the second node using FEC.
10. The one or more non-transitory computer-readable media according to clause 9, further comprising updating a state of a state machine based on the record of previous FEC and non-FEC transmissions with the second node, wherein determining that FEC should be used to transmit the message is further based on the state of the state machine.
11. The one or more non-transitory computer-readable media according to clause 9 or clause 10, wherein the state of the state machine is selected from a group consisting of an initial state wherein the record of previous FEC and non-FEC transmissions with the second node is initialized, a use non-FEC state wherein messages are transmitted without using FEC before attempting to transmit the messages using FEC, a use FEC state wherein messages are transmitted using FEC after first attempting to transmit the messages without using FEC, and an always use FEC state wherein messages are transmitted using FEC without first attempting to transmit the messages without using FEC.
12. The one or more non-transitory computer-readable media according to any of clauses 9-11, wherein updating the state of the state machine further comprises:

transitioning from the use non-FEC state to the use FEC state in response to a number of successive attempts to transmit the message without using FEC and without receiving an acknowledgement being above a threshold number.

13. The one or more non-transitory computer-readable media according to any of clauses 9-12, wherein updating the state of the state machine comprises transitioning from the use FEC state to the always use FEC state in response to a number of messages being transmitted using FEC being above a threshold number.

14. The one or more non-transitory computer-readable media according to any of clauses 9-13, wherein updating the state of the state machine comprises transitioning from the always use FEC state to the use non-FEC state in response to a number of messages being transmitted using FEC being above a threshold number.

15. The one or more non-transitory computer-readable media according to any of clauses 9-14, wherein updating the state of the state machine comprises transitioning from the use FEC state to the use non-FEC state in response to a number of messages being transmitted using FEC being below a threshold number.

16. According to some embodiments, a first network device in a mesh network comprises a memory storing a communication application and a processor coupled to the memory. The processor executes the communication application to perform the steps of receiving a message; identifying, based on a destination address associated with the message, a neighbor network device in the mesh network to transmit the message to; analyzing a history of forward error correction (FEC) and non-FEC transmissions with the neighbor network device to determine that FEC or non-FEC should be used to transmit the message to the neighbor network device; and transmitting, in response to determining that FEC or non-FEC should be used to transmit the message to the neighbor network device, the message to the neighbor network device using FEC or non-FEC.

17. The first network device according to clause 16, wherein determining that FEC should be used to transmit the message to the neighbor network device comprises detecting that the first network device and the neighbor network device both support FEC and detecting that a minimum number of transmissions of the message to the neighbor network device without using FEC were unsuccessful.

18. The first network device according to clause 16 or clause 17, wherein detecting that FEC should be used to transmit the message comprises detecting that messages transmitted between the first network device and the neighbor network device should be transmitted using FEC without first attempting to transmit the messages without using FEC.

19. The first network device according to any of clauses 16-18, further comprising updating the history of FEC and non-FEC transmissions with the neighbor network device, in response to at least one of transmitting the message to the neighbor network device using FEC, transmitting the message to the neighbor network device without using FEC, receiving an acknowledgment from the neighbor network device for the message, or a timer timing out without receiving the acknowledgment.

20. The first network device according to any of clauses 16-19, further comprising storing the history of FEC and non-FEC transmissions with the neighbor network device in an entry in a neighbor table associated with the neighbor network device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   determining, by a communication application executing on a first node device based on one or more consecutive attempts to transmit messages to a second node device without using forward error correction (FEC) being unsuccessful, to use FEC to transmit messages to the second node device; and
   transmitting, by the communication application in response to determining to use FEC to transmit messages to the second node device, a first message to the second node device using FEC.

2. The method of claim 1, wherein determining to use FEC to transmit messages to the second node device comprises determining that a number of the one or more consecutive attempts is above a threshold.

3. The method of claim 1, wherein determining to use FEC to transmit messages to the second node device is further based on a history of non-FEC transmissions with the second node device.

4. The method of claim 1, wherein determining to use FEC to transmit messages to the second node device comprises determining that messages transmitted to the second node device should be transmitted using FEC without first attempting to transmit the messages without using FEC.

5. The method of claim 1, further comprising updating, by the communication application, a history of FEC and non-FEC transmissions with the second node device, in response to transmitting the first message to the second node device using FEC.

6. The method of claim 5, further comprising updating, by the communication application, the history of FEC and non-FEC transmissions with the second node device in response to receiving an acknowledgment from the second node device for a transmitted message or a timer timing out without receiving an acknowledgment.

7. The method of claim 1, further comprising maintaining one or more counters selected from a group consisting of:
   a counter storing a count of messages transmitted to the second node device using FEC where an acknowledgment was received;
   a counter storing a count of messages transmitted to the second node device without using FEC where an acknowledgment was received; and
   a counter storing a count of messages transmitted to the second node device without receiving an acknowledgment.

8. The method of claim 1, further comprising:
   receiving, by the communication application, a second message;
   determining, by the communication application, a third node device to transmit the second message to, the third node device being a neighbor of the first node device;
   determining, by the communication application based on one or more consecutive attempts to transmit messages to the third node device without using FEC, that the second message should be transmitted without using FEC; and
   transmitting, by the communication application in response to determining that the second message should be transmitted without using FEC, the second message to the third node device without using FEC.

9. One or more non-transitory computer-readable media storing instructions that, when executed by one or more processors, cause the one or more processors of a first node in a mesh network to perform the steps of:
   counting a number of one or more consecutive unsuccessful attempts to transmit a message to a second node of the mesh network without using forward error correction (FEC);
   determining, based on the number, that FEC should be used to transmit messages to the second node; and
   transmitting, in response to determining that FEC should be used to transmit messages to the second node, a first message to the second node using FEC.

10. The one or more non-transitory computer-readable media of claim 9, further comprising:
    updating a state of a state machine based on the number;
    wherein determining that FEC should be used to transmit messages to the second node is further based on the state of the state machine.

11. The one or more non-transitory computer-readable media of claim 10, wherein the state of the state machine is selected from a group consisting of:
    an initial state wherein the number is initialized;
    a use non-FEC state wherein messages are transmitted to the second node without using FEC before attempting to transmit the messages to the second node using FEC;
    a use FEC state wherein messages are transmitted using FEC to the second node after first attempting to transmit the messages to the second node without using FEC; and
    an always use FEC state wherein messages are transmitted using FEC to the second node without first attempting to transmit the messages to the second node without using FEC.

12. The one or more non-transitory computer-readable media of claim 11, wherein updating the state of the state machine further comprises:
    transitioning from the use non-FEC state to the use FEC state in response to the number being above a threshold number.

13. The one or more non-transitory computer-readable media of claim 11, wherein updating the state of the state machine comprises:

transitioning from the use FEC state to the always use FEC state in response to a number of messages transmitted to the second node using FEC being above a first threshold number.

14. The one or more non-transitory computer-readable media of claim 13, wherein updating the state of the state machine comprises:
transitioning from the always use FEC state to the use non-FEC state in response to a number of messages transmitted to the second node using FEC being above a second threshold number larger than the first threshold number.

15. The one or more non-transitory computer-readable media of claim 11, wherein updating the state of the state machine comprises:
transitioning from the use FEC state to the use non-FEC state in response to a number of messages transmitted to the second node using FEC being below a threshold number.

16. A first network device in a mesh network, comprising:
a memory storing a communication application; and
a processor coupled to the memory that executes the communication application to perform the steps of:
analyzing a history of one or more consecutive attempts to transmit a first message to a neighbor network device without using forward error correction (FEC) that were unsuccessful to determine that FEC or non-FEC should be used to transmit messages to the neighbor network device; and
transmitting, in response to determining that FEC or non-FEC should be used to transmit messages to the neighbor network device, the first message to the neighbor network device using FEC or non-FEC.

17. The first network device of claim 16, wherein determining that FEC should be used to transmit messages to the neighbor network device comprises:
detecting that the first network device and the neighbor network device both support FEC; and
detecting that a minimum number of message transmissions to the neighbor network device without using FEC were unsuccessful.

18. The first network device of claim 16, wherein detecting that FEC should be used to transmit messages to the neighbor network device comprises detecting that messages transmitted to the neighbor network device should be transmitted using FEC without first attempting to transmit the messages without using FEC.

19. The first network device of claim 16, further comprising:
updating a history of FEC and non-FEC transmissions with the neighbor network device, in response to at least one of transmitting a message to the neighbor network device using FEC, transmitting a message to the neighbor network device without using FEC, receiving an acknowledgment from the neighbor network device for a message, or a timer timing out without receiving an acknowledgment.

20. The first network device of claim 19, further comprising storing the history of FEC and non-FEC transmissions with the neighbor network device in an entry in a neighbor table associated with the neighbor network device.

* * * * *